(12) United States Patent
Furlotti

(10) Patent No.: US 11,485,103 B2
(45) Date of Patent: Nov. 1, 2022

(54) METHOD AND APPARATUS FOR MANUFACTURING POUCHES

(71) Applicant: I.M.A. INDUSTRIA MACCHINE AUTOMATICHE S.P.A., Bologna (IT)

(72) Inventor: Filippo Furlotti, Traversetolo (IT)

(73) Assignee: I.M.A. INDUSTRIA MACCHINE AUTOMATICHE S.P.A., Bologna (IT)

( * ) Notice: Subject to any disclaimer, the term of this patent is extended or adjusted under 35 U.S.C. 154(b) by 158 days.

(21) Appl. No.: 16/499,688

(22) PCT Filed: Mar. 22, 2018

(86) PCT No.: PCT/EP2018/057337
§ 371 (c)(1),
(2) Date: Sep. 30, 2019

(87) PCT Pub. No.: WO2018/177895
PCT Pub. Date: Oct. 4, 2018

(65) Prior Publication Data
US 2021/0094252 A1   Apr. 1, 2021

(30) Foreign Application Priority Data

Mar. 31, 2017 (IT) .................. 102017000035537

(51) Int. Cl.
*B31B 70/00* (2017.01)
*B31B 70/10* (2017.01)
(Continued)

(52) U.S. Cl.
CPC ............ *B31B 70/006* (2017.08); *B31B 70/10* (2017.08); *B31B 70/642* (2017.08);
(Continued)

(58) Field of Classification Search
CPC ............ B32B 37/1292; B32B 38/1825; B32B 2439/46; B32B 38/1833; B31B 70/642;
(Continued)

(56) References Cited

U.S. PATENT DOCUMENTS 3,762,125 A * 10/1973 Prena .................. B65B 47/04
 53/51
3,840,421 A * 10/1974 Peterson .............. B41F 15/18
 156/384

(Continued)

FOREIGN PATENT DOCUMENTS

| GB | 2355955 A | 5/2001 |
|---|---|---|
| WO | 8600569 A1 | 1/1986 |

OTHER PUBLICATIONS

International Search Report dated Jun. 20, 2018 re: Application No. PCT/EP2018/057337, pp. 1-4, citing: U.S. Pat. No. 9,180,987 B2 and GB 2 355 955 A.

(Continued)

*Primary Examiner* — Thomas M Wittenschlaeger
(74) *Attorney, Agent, or Firm* — Cantor Colburn LLP

(57) ABSTRACT

A method for manufacturing pouches made of at least partly thermoplastic material, including the steps of superimposing at least two webs of at least partly thermoplastic material, joining the webs at adhesion regions or lines, and cutting the webs at cutting regions or lines in order to provide pouches. In a condition in which the webs are superimposed, the method further includes the step of mutually aligning the webs by causing the elongation of at least one of the two webs via the application of heat.

2 Claims, 3 Drawing Sheets

(51) Int. Cl.
*B31B 70/64* (2017.01)
*B32B 37/12* (2006.01)
*B32B 38/18* (2006.01)
*B31B 155/00* (2017.01)

(52) U.S. Cl.
CPC ...... *B32B 37/1292* (2013.01); *B32B 38/1825* (2013.01); *B31B 2155/002* (2017.08); *B32B 2439/46* (2013.01)

(58) Field of Classification Search
CPC . B31B 70/006; B31B 70/10; B31B 2155/002; B65B 41/18
See application file for complete search history.

(56) References Cited

U.S. PATENT DOCUMENTS

| | | | | |
|---|---|---|---|---|
| 4,034,536 A | * | 7/1977 | Mahaffy | B29C 51/22 53/433 |
| 4,496,417 A | * | 1/1985 | Haake | B65H 23/1882 156/361 |
| 4,706,439 A | * | 11/1987 | Barton | B65D 21/0238 53/128.1 |
| 4,881,933 A | * | 11/1989 | Wech | B31B 70/00 493/225 |
| 5,470,411 A | * | 11/1995 | Gloton | B32B 38/1841 156/64 |
| 6,033,502 A | * | 3/2000 | Coenen | A61F 13/15772 156/64 |
| 6,247,293 B1 | * | 6/2001 | Todd | B29C 65/18 53/329.2 |
| 6,820,399 B2 | * | 11/2004 | Send | B65B 41/18 493/10 |
| 6,983,686 B2 | * | 1/2006 | Vaughn | B31F 1/07 101/226 |
| 9,180,987 B2 | | 11/2015 | Grimm et al. | |
| 2007/0056252 A1 | * | 3/2007 | Wetter | B65B 9/04 53/441 |
| 2012/0035036 A1 | * | 2/2012 | Pease | B31B 50/81 493/264 |
| 2017/0095968 A1 | * | 4/2017 | Rabiea | B31B 70/984 |

OTHER PUBLICATIONS

Written Opinion dated Jun. 20, 2018 re: Application No. PCT/EP2018/057337, pp. 1-7, citing: U.S. Pat. No. 9 180 987 B2 and GB 2 355 955 A.

* cited by examiner

METHOD AND APPARATUS FOR MANUFACTURING POUCHES

TECHNICAL FIELD

The present disclosure relates to a method and an apparatus for manufacturing pouches for food containers of the doypack type and the like from material in sheet form. These flexible food containers are typically used for containing beverages or fruit purees.

Such sheets are usually of superimposed multiple layers, in which at least one layer comprises or is constituted by a thermoplastic material.

BACKGROUND

In the state of the art, methods and machines are known for providing pouches made of thermoplastic material, such as for example described in PCT application WO86/00569 or GB2355955A.

The pouches are made starting from at least two webs of material in sheet form, typically multilayer, which are unwound from corresponding rolls. The webs are superimposed and bonded together at adhesion regions or lines. Downstream of this operation, the webs are rendered integral at these adhesion lines and then they are conveniently cut in the form of final pouches.

In the process the webs are kept stretched by pulling rollers which are arranged variously according to the implementation.

Typically the pouches thus produced have printed designs on both of their outward faces. It is therefore necessary to bring the two webs in register, in such a way that the printed designs are aligned on the two faces, so as to prevent production discards. In fact, the webs to be bonded in order to obtain the pouches can be supplied by different manufacturers and therefore they may not be completely identical in structure, spacing of the printed designs, materials and dimensions.

The difficulty of this alignment step is increased when one considers the typical high speed of operation of these machines and the thickness of the plastic webs used.

In the state of the art it is known to check that the webs are in register using for example an optical system to identify markers printed on the surface of each web. If the optical system detects a misalignment between the markers of the webs, it becomes necessary to discard the pouches produced and to once again bring the webs in register. Such operation entails discards and slowdowns in production.

Such solution has certainly been found to be useful, but it is rather unsuited to correcting small misalignments and adjusting is difficult.

In particular it has been found that, in the transition between a condition of misalignment and one of realignment, quite some meters of web can be wasted.

U.S. Pat. No. 9,180,987 B2 discloses a thermoform packaging machine comprising a forming station for forming packaging troughs into a first film web, a stretching station with a heating unit for stretching a second film web for covering the packaging troughs, wherein the second film web is actively cooled by means of a film cooling device after stretching.

SUMMARY

The aim of the present disclosure relates to providing a method and an apparatus for manufacturing pouches for food containers of the doypack type and the like which solve the above technical problem, eliminate the drawbacks and overcome the limitations of the prior art, by making it possible to bring the webs in register precisely and rapidly, even for minimal deviations, without burdening the apparatus with costly and complex contrivances adapted for the purpose.

Within this aim, the disclosure relates to providing a method and an apparatus that are capable of offering the widest guarantees of reliability and safety in use.

Furthermore, the present disclosure overcomes the drawbacks of the prior art in a different manner to existing solutions.

The disclosure further relates to providing a method and an apparatus that are simple to provide and economically competitive when compared to the prior art.

This aim and these and other advantages which will become better apparent hereinafter are all achieved by providing a method for manufacturing pouches made of at least partly thermoplastic material, which comprises the steps of:

a. superimposing at least two webs of at least partly thermoplastic material;

b. joining said webs at adhesion regions or lines;

c. cutting said webs at cutting regions or lines in order to provide pouches;

characterized in that it comprises the step of:

a1. mutually aligning the webs by causing the elongation of at least one of the two webs via the application of heat.

The aim and the advantages of the disclosure are likewise achieved by an apparatus for manufacturing pouches made of at least partly thermoplastic material, which comprises:

a first and a second roll magazine, each magazine being designed to receive a roll of web of material in sheet form;

a bonding station, downstream of the roll magazines, for bonding the webs at adhesion regions or lines;

a pulling station, for keeping the bonded webs under tension;

a cutting station, for cutting the bonded webs into pouch form;

characterized in that it comprises at least one heating station, arranged between the roll magazines and the bonding station, in order to apply heat to at least one of the webs.

By adopting this solution, the above advantages are achieved and the limitations of the state of the art are overcome.

BRIEF DESCRIPTION OF THE DRAWINGS

Further characteristics and advantages of the disclosure will become better apparent from the detailed description of a preferred, but not exclusive, embodiment of a method and of an apparatus, which is illustrated by way of non-limiting example with the aid of the accompanying drawings wherein.

DETAILED DESCRIPTION OF THE DRAWINGS

Figure 1:
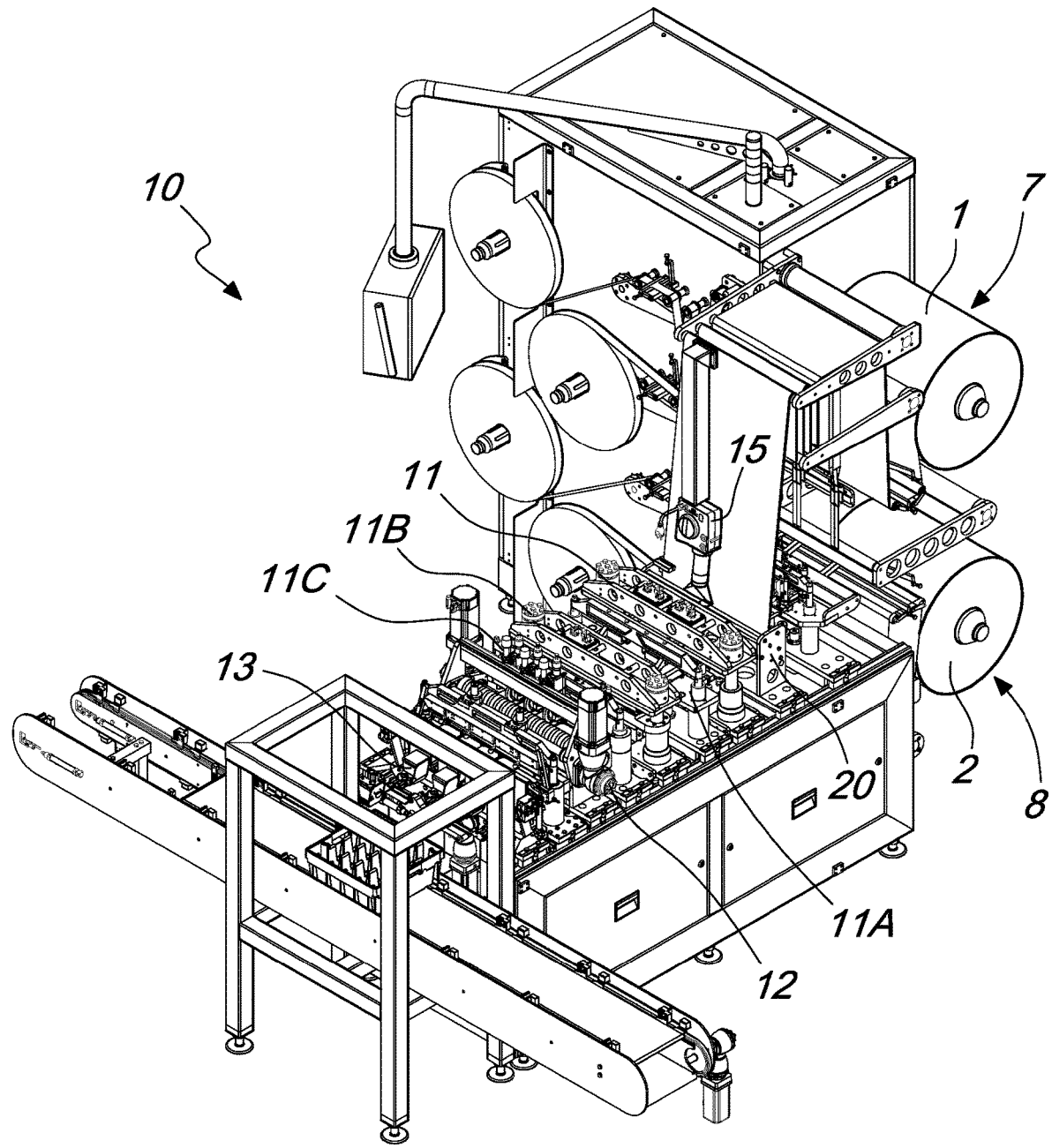
FIG. 1 is a perspective view of an embodiment of an apparatus, according to the disclosure.
Figure 2:
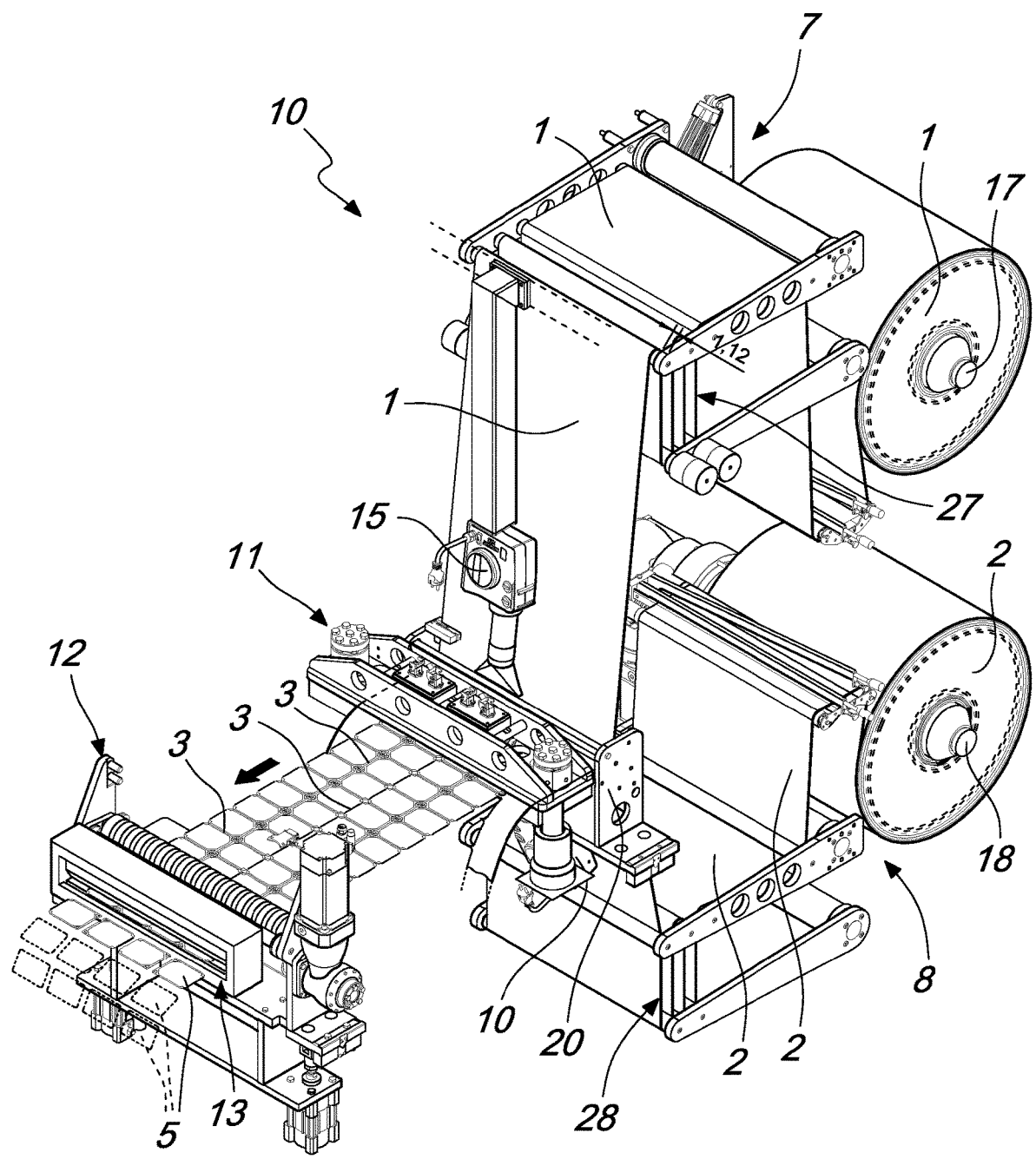
FIG. 2 is a perspective view of the apparatus in the previous figure, with some components removed.
Figure 3:
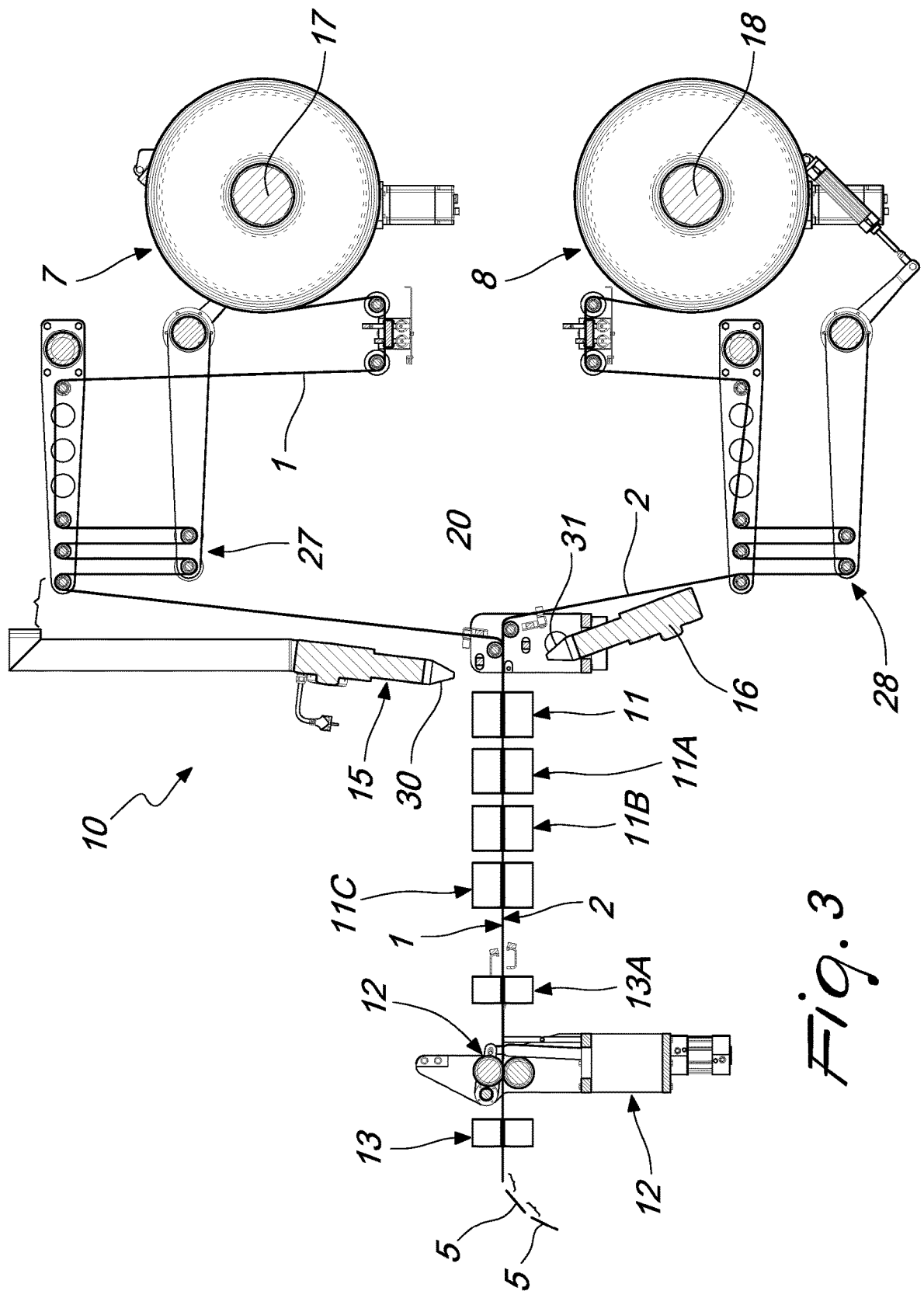
FIG. 3 is a schematic cross-sectional view of part of the apparatus in the previous figures.

With reference to FIGS. 1-3, first the apparatus will be described and, subsequently, the method of the disclosure will be described.

With reference to the accompanying figures, these show a non-limiting embodiment of an apparatus for manufacturing pouches made of material in sheet form according to the disclosure, which is generally designated with the reference numeral 10.

The apparatus 10 comprises a first roll magazine 7 and a second roll magazine 8. The roll magazines 7, 8 are each designed to receive a roll of web of the material in sheet form, which is fitted on a corresponding shaft 17, 18. It should be noted that more than two magazines and respective rolls may be provided in other embodiments, for example in order to form pouches in which one or both sides are formed from multiple sheets of multilayer material, mutually superimposed. In another, alternative embodiment, not shown, it is possible to bond two portions of the same film by folding half of it onto itself after unwinding from the roll.

In the present discussion, the description refers to the example case illustrated of two webs of material in sheet form, which therefore should be understood to be non-limiting.

Generally, the material in sheet form comprises at least one layer of thermoplastic material, preferably polyethylene (PE).

Preferably the material in sheet form is a multilayer material, and the layer made of thermoplastic material, preferably polyethylene (PE), is arranged so as to be visible from outside once the pouch 5 is formed. An example could be a material in sheet form in two layers, PE and PET (polyethylene terephthalate).

Even more preferably, the material in sheet form comprises two layers of thermoplastic material, preferably polyethylene (PE), which are arranged, for each sheet, on the outside, optionally interspersed by other materials. Alternatively the material in sheet form comprises two layers of thermoplastic material, preferably polyethylene PE and polyethylene terephthalate PET respectively, which are arranged, for each sheet, on the outside and are interspersed by other materials, for example a layer of aluminum, or one layer of aluminum and one of nylon.

Particularly, examples of a material in sheet form that are particularly adapted for being processed according to the teachings of the disclosure entail:

a layer of PE;
two layers: PE/PET;
three layers: PE/aluminum/PET;
four layers: PE/nylon/aluminum/PET.

One or both of the webs of material in sheet form have, at least on the face that is to constitute the outer face of the pouch 5, printed designs and/or etchings and/or portions in relief that will appear correspondingly on the finished pouch 5 for the purposes of decoration and/or identification of the product.

Preferably, markers are printed on the webs of the rolls 1 and 2 and are adapted to enable identification of the position of the respective web during unwinding with respect to a known reference point.

Optionally, as in the example shown, the roll magazines 7, 8 each comprise a device for tensioning the web, respectively 27 and 28, which comprises a plurality of rollers arranged on two rows that are substantially parallel and spaced apart, between which the web 1 or 2, which is unwound from the rolls which are located directly upstream, is arranged under tension.

In some embodiments the devices 27 and 28 for tensioning the web also perform a "buffer" function. In this case the rollers of the tensioning devices 27 and 28 are mounted on an articulated and/or slideable supporting structure that allows a certain movement thereof. This type of implementation is also known in the sector as a "dancer" and it will not be discussed further here.

The apparatus 10 also comprises, downstream of the roll magazines 7, 8, an overlapping station 20, for placing the webs 1, 2 in the adjacent and superimposed condition.

Downstream of the overlapping station 20 a bonding station 11 is provided, which is designed to bond the webs at adhesion regions or lines 3.

In the embodiment shown, the bonding station 11 also comprises a device for the longitudinal cutting of the edges of the webs 1, 2, to trim them. Such longitudinal cutting device the edges can however also be absent.

In a preferred embodiment, the station 11 performs the bonding of the so-called "bottoms" of the pouches, i.e. a transverse joint with respect to the advancement direction of the web 1, 2.

The bonding station 11 can be variously implemented according to the type of bonding to be carried out on the webs 1, 2.

For example for webs 1, 2 that comprise a layer of thermoplastic material (like PE), it is possible for the bonding to be carried out by way of heat-sealing; in this case the bonding station 11 comprises a female die part and a male die part between which the webs 1 and 2 pass. The female die part and/or the male die part are provided with heated blades that come into contact with the webs 1 and 2, pressing them onto each other and heating them, until the adhesion regions or lines are formed.

In other embodiments, as an alternative to or in combination with the heat-sealing, the bonding can occur by way of ultrasonic sealing, taping and/or glueing, so that the two webs (or the folded portions of the same web) are stably anchored to each other, for example at the bottoms of the pouches or at the bottoms and at the sides of the pouches, with the exception of a pocket that remains open and which will define the mouth of the pouch 5.

The apparatus 10 also comprises a dragging or pulling station 12, downstream of the bonding station 11, in order to keep the bonded webs 1, 2 under tension, and convey them to a cutting station 13, downstream of the pulling station 12, in order to cut or punch out the bonded webs into pouch 5 form.

In the embodiment shown, the pulling station 12 and cutting station 13 are shown integrated in a single unit, but in other embodiments they are separate.

In the preferred embodiment, the cutting station 13 performs a transverse cut with respect to the advancement direction of the webs 1, 2.

A longitudinal cutting of the webs 1, 2 which are now in the bonded condition is envisaged upstream of the pulling station 12 at the optional station 13A.

With reference to the overlapping station 20, this is provided with rollers, preferably idle, for placing in the adjacent and superimposed condition (substantially in contact) the two webs 1 and 2 which are fed to the subsequent bonding station 11.

Optionally the apparatus 10 also comprises a cooling station 11A which is arranged downstream of the bonding station 11 and is designed to cool the webs at least at the adhesion regions or lines 3, for example at the bottoms of the pouches.

If the bonding station 11 has generated only transverse joints (i.e. the bottoms of the pouches), downstream of the cooling station 11A (if envisaged) or more generally downstream of the bonding station 11, then an additional bonding station 11B is provided, which is designed to provide longitudinal joints (e.g. the sides of the pouches) and this is carried out in a similar manner to the bonding station 11 described above.

Optionally, a die-punching station 11C is also provided, which is designed to form the corners of the pouches 5, for example with a rounded shape or the like.

In the preferred and illustrated form, therefore, the sequence of stations, starting from the magazines 7, 8 of web 1, 2 is the following:

overlapping station 20;
bonding station 11, optionally provided with a device for the longitudinal cutting of the edges;
cooling station 11A;
additional bonding station 11B;
longitudinal cutting station 13A;
pulling station 12;
transverse cutting station 13.

According to the disclosure, the apparatus 10 also comprises a heating station which is placed, generally, between the roll magazines 7, 8 and the bonding station 11, in order to supply heat to at least one of the webs 1, 2, so as to mutually align the webs 1, 2, thus causing the elongation of at least one of the two by way of such application of heat.

In fact, when a web of the type comprising at least one thermoplastic layer is heated, its temperature rises (at least locally), with a twofold effect:

firstly a thermal dilation takes place of the web subjected to heating, which increases its length with respect to the web that is not heated;
secondly (assuming that the traction force exerted on the webs by way of the pulling station 12 is the same for both) the web subjected to heating becomes more malleable than the other web and therefore it elongates, stretching in a longitudinal direction ("machine direction" or MD).

In short, causing the elongation of one of the webs 1 or 2 with respect to the other makes it possible to bring the webs 1 and 2 in register.

The extent of the elongation can be adjusted as a function of the quantity of heat applied to the web 1 or 2 that is heated.

Obviously, if the material is a multilayer material that comprises two (or more) different materials, then each material (for example, aluminum and PE), having its own specific thermal expansion coefficient, will tend to expand (elongate) differently from the others. This entails a slight "cambering" or curving of the web in the areas affected by the thermal dilation thus generated. However such curving is of such a low extent that it does not lead to the finished product being discarded.

In a preferred embodiment a single web 1 or 2 is heated. In another embodiment, the heat is applied to both of the webs 1 and 2, but preferably different amounts of heat are applied to one web and the other, so as to cause a different elongation between the two which could return them to the condition of longitudinal alignment.

In the embodiment shown, there are two heating stations 15 and 16, one operatively associated with the web 1 and the other with the web 2, said heating stations being arranged so as to selectively supply heat to a respective one of such webs 1, 2. In another embodiment, only one station 15 or 16 is envisaged, while in other embodiments there are as many heating stations as there are webs used, in order to selectively supply heat to respective webs.

The position on the apparatus 10 of the heating stations 15 and 16 is preferably chosen from between the overlapping station 20 and the bonding station 11, and even more preferably closer to the overlapping station 20 than to the bonding station 11, so as to permit the web 1, 2 being subjected to heating to have the necessary space for its elongation.

The heating station 15, 16 comprises a heat source which, in the example shown, comprises a generator of a stream of hot air which is directed toward at least one of the webs 1, 2. In other embodiments, not shown, the heat source is (or also comprises, in combination) a lamp, for example infrared, a laser, a microwave generator or similar heat sources.

The generator of a hot air stream preferably comprises an electric resistance and a fan, which generates an air flow, which is heated by the electric resistance and is conveyed onto the web 1 or 2 by virtue of a diffusion outlet 30 or 31. Preferably the diffusion outlet 30, 31 is of the type adapted to generate a blade of air oriented toward the respective web 1, 2, i.e. an air flow concentrator.

In a preferred embodiment the outlet 30, 31 generates a blade of air that affects all of the web 1 or 2 transversely (perpendicular to the advancement direction of the web). In another embodiment, on the other hand, the outlet 30, 31 generates a blade of air that affects the respective web 1 or 2 only partially transversely. In this case the outlet 30, 31 is preferably movable in the transverse direction, for example by way of motorized actuation means, in order to orient the blade of hot air onto a preselected portion of the respective web.

The apparatus 10 also comprises a system for checking that these webs are in register (not shown) which detects any conditions of misalignment between the webs and which is connected functionally to the heating station 15, 16 in order to control the heating station at least for switching on/switching off upon a detection of a condition of misalignment between the markers, so as to control the application of heat to the web or webs 1, 2 in order to reestablish a condition of alignment.

Preferably the system for checking that the webs are in register comprises an optical system, for example with optical sensors such as cameras or the like which detect the markers provided on the surfaces of the webs 1, 2.

The process of bringing the webs in register provides that the markers on the webs 1 and 2 follow each other (in the region monitored by the optical system, during the advancement of the webs 1 and 2) in a certain configuration: for example the markers of the upper web 1 must be synchronized with those of the lower web 2, i.e. they must pass by the monitored region at exactly the same time, in order to ensure that the printed designs on the upper web and on the lower web are arranged correctly, not only with respect to each other but also as a function of the position that they assume with respect to the adhesion lines or areas 3.

Turning now to describe the method according to the disclosure, this relates to the manufacture of pouches made of thermoplastic material, and it comprises the steps of:

a. superimposing at least two webs 1, 2 of material in sheet form which comprises at least one layer of thermoplastic material;
b. joining the webs 1, 2 at adhesion regions or lines 3;
c. cutting the webs 1, 2 at cutting regions or lines 4 in order to provide pouches.

According to the disclosure the method comprises the step of:

a1. mutually aligning the webs 1, 2, causing the elongation of at least one of the two via the application of heat.

Preferably the above step a1 comprises a step of applying heat, which is obtained by directing a stream of hot air onto at least one web 1, 2 so as to cause its elongation.

If the webs are made with a material in sheet form that has at least one layer of polyethylene (PE) or polyethylene terephthalate (PET), or a multilayer material in sheet form with two outer layers of polyethylene (PE) or polyethylene terephthalate (PET) and an intermediate layer of aluminum or two outer layers of polyethylene (PE) or polyethylene terephthalate (PET) between which there are a layer of nylon and one of aluminum, for example, the hot air stream is at a temperature comprised between 60° C. and 90° C.

These temperatures are examples, in that the person skilled in the art is capable of choosing the most suitable temperatures for the purpose. For example, for a material in sheet form made up of three layers (PE/Al/PET), with the following thicknesses:

PE: 50-90 microns,
Al: 6-10 microns,
PET: 50-90 microns, the above air flow temperature intervals are found to be particularly indicated.

Although it is in general possible to act on the webs 1, 2 prior to the overlapping station 20, the step a1 is preferably carried out when the webs 1, 2 are superimposed, immediately downstream and close to the overlapping station 20, for the previously-mentioned reasons.

As noted, the method of the disclosure envisages a step of checking the alignment of the webs 1, 2, preferably carried out by way of optical detection of markers provided on the surface of the webs 1, 2.

The control system provided for this checking step is configured to monitor that the markers of the two webs 1 and 2 are superimposed in register, or mutually positioned according to a preset distance, and to detect substantially instantly, i.e. with a delay that is due to its processing speed, a misalignment of the markers of the web 1 and of the web 2 with respect to the mutual preset position. Following the detection, the control system activates the heating station 15 or 16 which operates on the web 1 or 2 whose markers are located further ahead with respect to the expected position, in order to elongate the corresponding web in its advancement direction. In other words, if at a given time the control system has detected the marker of the web 1 without having detected the marker of the web 2 yet, the latter marker is deemed to be late and the web 1 is accordingly heated. Once the control system verifies, for example again by way of optical detection, that the markers have returned to being positioned in register or according to the preset distance, the heating station 15 or 16 that was switched on previously is switched off.

The step of applying heat is thus invoked automatically by the detection of a condition of misalignment of the markers.

Such step of applying heat can be invoked not only by switching on/switching off the heat source, but optionally also by controlling the amount of heat that is dispensed at the heating station 15, 16 as a function of the degree of misalignment detected.

For example, if the heat is applied by way of directing a stream of hot air onto the web 1, 2 then the temperature of the air and/or its flow-rate will be controlled, alternately or in combination, by acting respectively on the electric resistance or on the fan.

Operation of the apparatus 10 is clear and evident from the foregoing description. In particular, the apparatus 10 described above carries out the method presented.

In practice it has been found that the method and the apparatus, according to the present disclosure, achieve the intended aim and advantages in that they make it possible to bring the webs in register precisely and rapidly, even for minimal deviations, without burdening the apparatus with costly and complex contrivances adapted for the purpose.

The solution presented here furthermore is easily and practically provided and implemented even on already-existing machines.

The method and the apparatus thus conceived are susceptible of numerous modifications and variations, all of which are within the scope of the appended claims Moreover, all the details may be substituted by other, technically equivalent elements.

In practice the materials employed, provided they are compatible with the specific use, and the contingent dimensions and shapes, may be any according to requirements.

The disclosures in Italian Patent Application No. 102017000035537 from which this application claims priority are incorporated herein by reference.

The invention claimed is:

1. A method for manufacturing empty pouches made of at least partly thermoplastic material, including the following steps:
   a. superimposing at least two webs of at least partly thermoplastic material;
   b. joining said webs at adhesion regions or lines;
   c. cutting said webs at cutting regions or lines in order to provide empty pouches with an open mouth through which said empty pouches are configured to be filled, and
   further including, after said step of superimposing the webs, the step of:
   a1. in a condition in which the webs are superimposed, exerting a traction force on said webs and causing the selective elongation of at least one of the two webs via the application of heat, wherein said heat is applied to at least one of the two webs so as to mutually align said webs as result of said elongation and wherein said heat is applied before the step b. of joining the webs;
   wherein said heat is applied by directing a stream of hot air onto the at least one of the two webs, and
   wherein the stream of hot air is at a temperature comprised between 60° C. and 90° C.

2. The method according to claim 1, further including a step of checking an alignment of said webs, performed via optical detection of markers provided on a surface of said webs, and wherein the application of heat is controlled by the detection of a condition of misalignment of said markers.

* * * * *